June 14, 1955   J. F. McCLENNY, JR   2,710,683
CONVEYOR APPARATUS FOR HARVESTING
Filed June 29, 1953   3 Sheets-Sheet 2
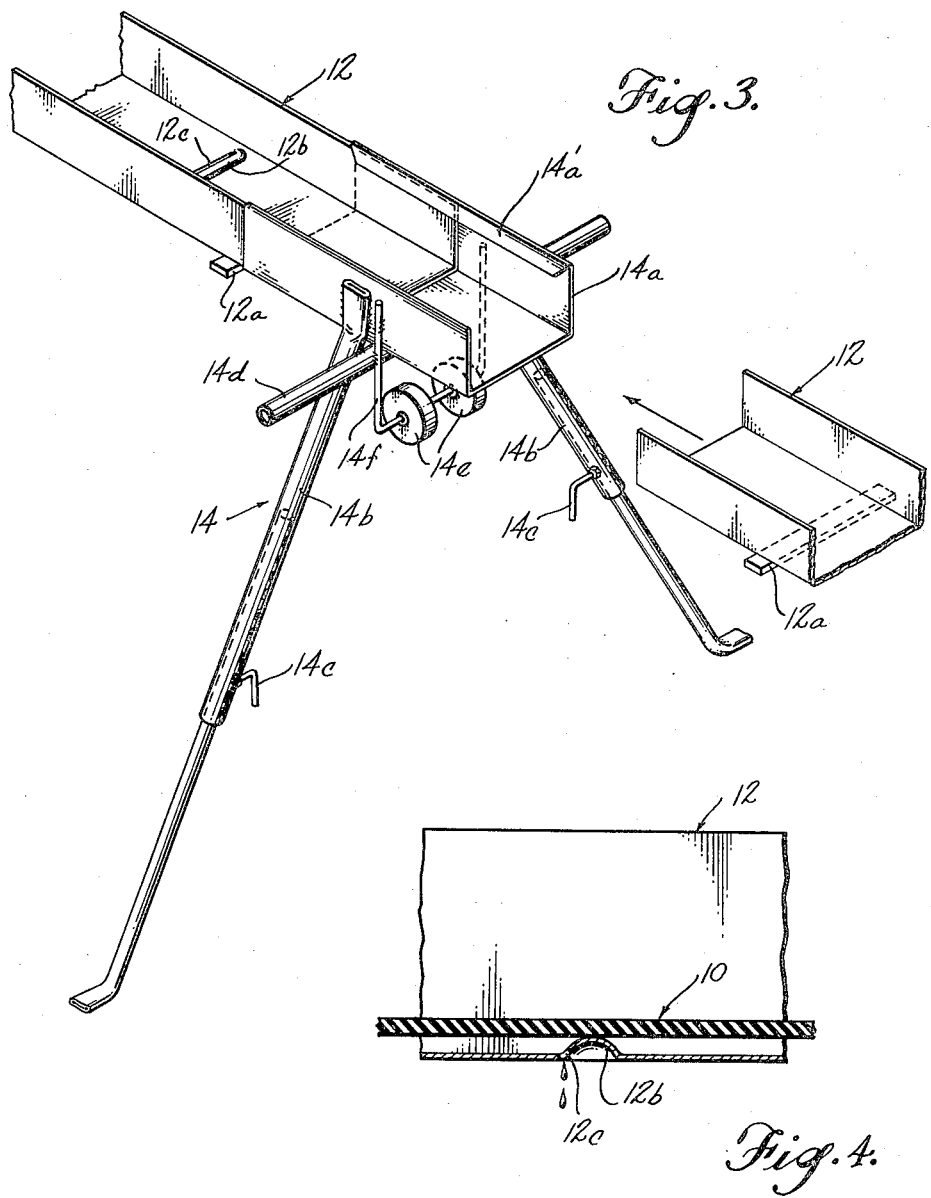
INVENTOR.
JAMES F. McCLENNY JR.
BY
Reynolds, Beach & Christman
ATTORNEYS

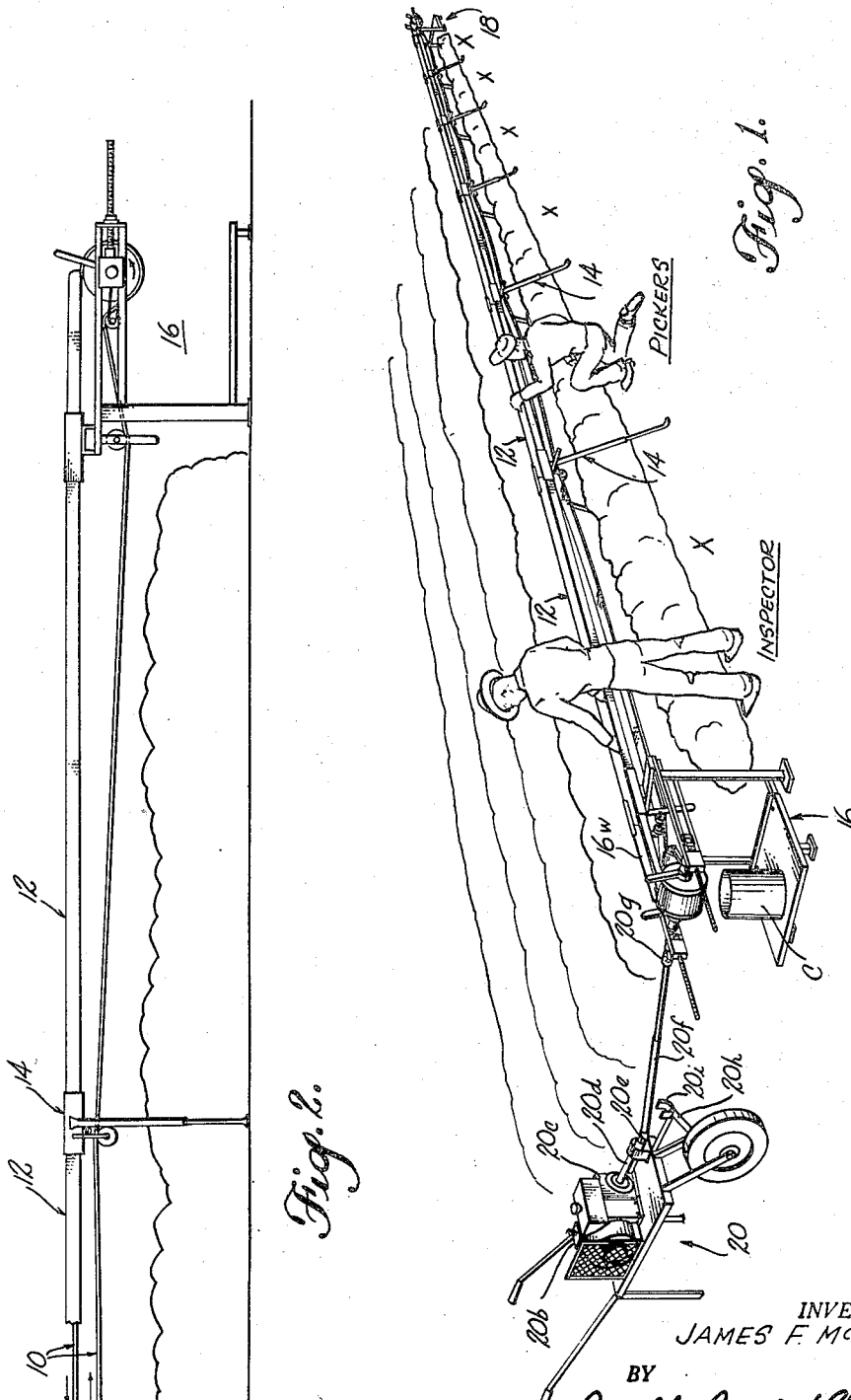

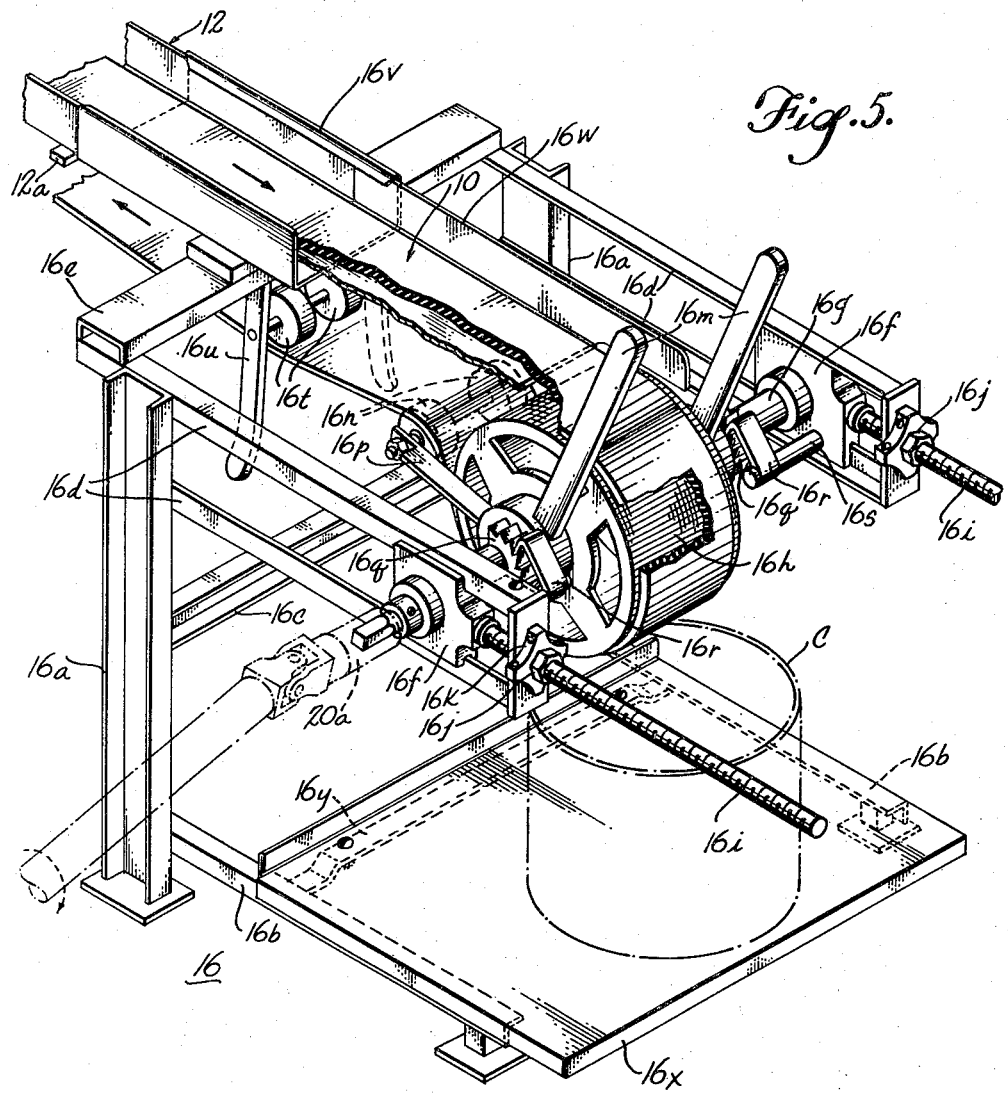

United States Patent Office 2,710,683
Patented June 14, 1955

2,710,683

CONVEYOR APPARATUS FOR HARVESTING

James F. McClenny, Jr., Anacortes, Wash.

Application June 29, 1953, Serial No. 364,811

22 Claims. (Cl. 198—184)

This invention relates to a multiple-section conveyor apparatus and to a method for harvesting strawberries and similar row crops preferably implemented with such apparatus. The invention is herein illustratively described by reference to its presently preferred form and mode of practice as applied to the harvesting of strawberries, but it will be understood that certain modifications and changes therein may be made without departing from the essential or characterizing features involved.

Because of the great susceptibility of strawberries to mold and to other causes and accelerators of rot, including moisture and the effects of excessive handling, their very short ripening season and the manner in which they grow (on the ground), strawberries are extremely difficult to harvest at reasonable cost and without substantial losses. The perennial problem of enlisting a crew of pickers willing and able to perform this tedious and muscle cramping work at the low rate of pay which they could earn in the past on the poundage basis has caused many a loss to the farmers. The majority of pickers in many parts of the country are merely school children. The plants must be picked over several times during the short ripening season, and the pickers must work fast and, to avoid transmission of rot from bad to good berries in a pack, carefully. Furthermore, under the former system of compensation on a poundage basis, indifferent or unscrupulous pickers would tend to mingle moldy and otherwise spoiled berries, not to mention rocks and other debris, with good berries. Except by expensive inspection methods involving rehandling, these faults would frequently go unnoticed.

The usual method of picking strawberries is for the pickers to deposit a supply of crates at or near a central weighing station on a strawberry field and carry individual hallocks along with them to be used as picking containers. As the picker in crouched or kneeling position progressed along a row of plants, the hallock would have to be picked up and shifted with each move. After the hallock was filled, it would be carried to the weighing station for the picker to receive wage credit and then emptied into a crate. A relatively large proportion of the picker's time, therefore, was spent in handling the hallocks and walking the sometimes long distances between the berry plants and the crates or the weighing station.

With these and other problems in view, the present invention is directed generally to the provision of a greatly improved, novel method for harvesting strawberries and the like, and to a novel conveyor apparatus useful in carrying out such method and for other purposes.

In its method aspects the invention provides a technique for harvesting strawberries and the like enabling pickers to cover a row or a portion of a row of strawberry plants quickly and without necessity of carrying hallocks, to harvest the berries under conditions permitting picked berries to be readily inspected and culled before becoming comingled in a common container, and furthermore, to afford opportunity for drainage of wet berries before reaching the container. Another object is a method of harvesting strawberries and the like involving a minimum of handling of the picked berries in transporting and preparing them for a final pack.

The invention further concerns itself with a novel multiple-section conveyor apparatus which is readily portable, easily assembled and disassembled, and one which is particularly suited for use in harvesting row crops according to the novel method herein disclosed. It is a further object to provide a portable conveyor which is very light in weight and is otherwise adapted to be picked up intact by a crew of pickers and moved from one crop row to another as the field is progressively covered. Another object is a multiple-section conveyor apparatus which may be dismantled in a short time for transportation from one field to another and which may be set up again as quickly in a new location, all with a minimum use of tools and special equipment.

Additional objects of the improved conveyor apparatus include strength, durability, simplicity, low cost, adaptability to the varying conditions encountered in harvesting field crops, a means of supporting the conveyor with minimum interference with the picker's activities and with minimum damage to the plants, a convenient arrangement for applying drive power to the conveyor belt by means of a separately portable power source, and adjustability to allow for uneven ground and for curvature and variable slope of the crop rows being picked.

In accordance with the improved method of harvesting strawberries, a portable conveyor is set up over and along or closely alongside a row of the plants with pickers stationed at intervals along the row. Each picker is assigned a different portion of the row according to his speed relative to the other pickers so that all will finish at approximately the same time. The berries picked are deposited directly into the trough of the conveyor and carried thereby to the discharge end of such conveyor, at which a suitable receptacle is placed to receive the berries. Preferably one or more inspectors are stationed near the discharge end of the conveyor to cull out the bad berries and any debris before they are permitted to drop into the receptacle. In this manner later handling of the berries for culling purposes may be obviated. Moreover, if the berries are picked wet as they often are in some parts of the country, an opportunity is afforded for the berries to dry off in their transit along the conveyor. This opportunity for drainage of the berries before being closely packed is a decided advantage because of their tendency to soften and spoil when moist.

At a signal the pickers having finished with a particular row of plants assume certain stations along the entire length of the conveyor and as a team lift the same bodily and move it over to another and usually adjacent row whereupon the process is repeated. In this manner an entire field can be very quickly covered, and because of a great reduction in the loss of berries due to spoilage and the considerable increase in the output of a picker with this method of harvesting, it is possible to pay good pickers much higher wages than heretofore. Not only are the bad berries easily culled out, but the good berries are handled and bruised much less than ordinary.

In its form described herein the conveyor apparatus comprises a plurality of elongated, resiliently flexible sheet metal channels, any desired number of which may be connected together in series alignment by means of detachable supporting socket members. The adjacent ends of successive channels are received in these socket units and supported thereby at the desired height above ground. Thus held, these channels form a lightweight, but relatively stiff, conveyor span structure capable of resisting conveyor belt tension while serving as a retaining guide trough for berries carried on the upper stretch of the endless conveyor belt, sliding on the channel bottoms. The tension in the belt places the entire chain of aligned channels and interconnecting socket units in compression holding these otherwise directly separable units together. No other securing means between the channels and socket units are necessary.

Preferably antifriction ribs formed at intervals in the channel bottoms reduce the total belt friction so that belt lengths up to several hundred feet may be driven by a single pulley at relatively low power. Drain slits in the conveyor channel bottoms permit water collecting therein to run off. Flexibility of the chain of mutually aligned sheet metal channels and a certain degree of flexibility in the socketed connections between the channels held together by belt tension permits the assembled conveyor to be picked up intact and moved easily without damage and without coming apart and also enables the conveyor to be distorted from a true straight line without ill effect on the structure or on its operating efficiency. This is important in the case of crop rows which are not planted perfectly straight or which are planted in hilly country.

The supporting socket units cooperating with the spanning channels comprise a relatively short socket channel of sheet metal with folded flanges within which the spanning channel flanges are slidably socketed for interconnecting the ends of adjoining channels. Such channel sockets are carried by downwardly divergent legs spread apart sufficiently to straddle the plants and telescopingly adjustable for leveling and for establishing the height of the socket units, hence of the conveyor channels. The conveyor belt return stretch is guided on rollers carried by transverse supports beneath the channel sockets.

Two end stands are provided to support the remote ends of the end channels and provide support for end pulleys about which the conveyor belt is guided, one such pulley constituting the idler pulley and the other a driving pulley. These end pulleys rotate on transverse shafts having journals which can be shifted longitudinally of the conveyor for major belt take-up adjustment, whereas ratchet-held arms with belt tensioning rolls thereon are provided on the shafts themselves for additional or final, quickly effected belt take-up. Either end pulley may be driven, depending upon the desired direction of conveyance, and for that purpose as well as for reasons of portability, a detachable power unit is provided which may be easily connected and disconnected from either end pulley shaft. Such detachable power unit comprises a wheelbarrow-mounted gasoline driven motor provided with suitable gear reduction means and a drive shaft having a detachable coupling adapted to engage the pulley shaft. The drive shaft preferably incorporates two universal couplings and means therebetween permitting variations in length of the shaft, whereby positioning of the power unit relative to the pulley drive shaft is not critical in order to maintain drive engagement therebetween.

These and other features, objects and advantages including certain details of the preferred form thereof will become more fully evident from the following description by reference to the accompanying drawings.

Figure 1 is a perspective view of the conveyor apparatus set up for use in harvesting strawberries.

Figure 2 is a side elevation of a portion of the conveyor in operation.

Figure 3 is a perspective view illustrating the supporting socket unit and the way it interconnects adjoining spanning channels.

Figure 4 is a longitudinal section of a fragment of a spanning channel and the conveyor belt particularly illustrating the means for reducing belt friction and permitting drainage from the channel.

Figure 5 is a perspective view of one of the end stands of the conveyor.

The conveyor apparatus is formed of certain main units and prefabricated subassemblies which in themselves are not required to be dismantled when the conveyor apparatus is taken apart for transportation or storage purposes. These cooperable units or major components comprise the endless belt 10, a plurality of elongated spanning channels 12, a plurality of intermediate supporting socket units 14 interconnecting the channels in series alignment, the two opposite end stands 16 and 18 carrying the belt pulleys, and the portable power unit 20. These individual components and prefabricated units will now be described in the order mentioned.

The endless belt 10 is formed of any suitable flexible belting material such as canvas, rubberized canvas, leather, etc., and, for a particular site, is cut to a length somewhat in excess of twice the desired length of the assembled conveyor and the ends laced together to form the endless belt. In harvesting strawberries the conveyor length may be as much as four or five hundred feet, depending upon the length of the rows of berry plants. In that case the belt may be formed of one or more sections making up a total length of as much as one thousand feet, for example. Preferably this belt is five or six inches wide in the described application. Any suitable method of lacing the ends of the belt together in releasable or severable manner may be used.

The spanning channels 12, of which there may be any desired number depending upon the required length of the conveyor, are formed of sheet metal and in a typical case are approximately ten feet long, six inches wide and three inches high, the width being just slightly greater than that of the belt 10. These channels may be formed of aluminum alloy or other strong and lightweight resilient metal which resists rust and may be easily formed into the desired channel or trough shape. Near the ends of each spanning channel a transverse bar 12a is welded or otherwise secured across the bottom of the channel web exterior face to act as a stop limiting penetration of the end of the channel into the supporting socket to be described. Also, upwardly rounded, antifriction humps or ribs 12b are formed in the bottom or web of the channel constituting contact points for the belt 10 to slide easily on the channel bottom. In the example the humps or ribs 12b are of elongated form extending transversely across most of the width of the channel bottom and are formed with a suitable die tool which also cuts through the metal at the base of the rib to form a drain slit 12c. Thus any water running off strawberries dropped into the conveyor is free to run out the openings 12c. These ribs and openings are formed at short intervals, such as at one foot spacings along the length of each spanning channel 12. Because of these antifriction humps it is possible to employ conveyor belts of great length without requiring excessive power to move the belt and without setting up excessive tension in the belt for that purpose.

The channel-interconnecting supporting socket units 14 comprise the relatively short socket members 14a of channel form having inwardly and reversely folded flanges 14a' which slidably receive the flanges of the ends of adjoining spanning channels 12 in mutually aligned positions. As shown in Figure 3, the width and height of the socket channel 14a slightly exceed the corresponding cross sectional dimensions of the spanning channels 12 and the form of the socket is such that the spanning channel ends may be slid readily by direct longitudinal movement into and out of the sockets. The bar stops 12a abut the end edges of the socket bottoms and thereby limit penetration so that when the conveyor belt is tightened for use, and the column of interconnected channels is thereby loaded as a structural compression member, the ends of adjoining channels 12 will not tend to slide past one another in the sockets 14a. These stops are particularly desirable for that purpose since it is preferred that the ends of the spanning channels fit somewhat loosely in the sockets 14a in order to permit some further degree of flexibility in the conveyor structure, beyond that afforded by the flexibility of the sheet metal channels 12.

The units 14 further comprise the transversely spaced downwardly divergent tubular legs 14b provided with set screws 14c in order to hold the extensible leg elements in various length-adjusted positions so that the unit may be set up in level attitude at a required height upon uneven and non-level ground. The upper ends of these telescoping legs are flattened, bent at a small angle to the leg axis and welded to the sides of the socket channels 14a. Such legs are braced by a transverse bar or tube 14d, the ends of which project beyond the side flanges of the channel socket to afford convenient handles for lifting the unit and with it the connected conveyor structure. Belt guide rollers 14e are rotatatively supported below the channel socket 14a and tube 14d by means of the transversely disposed U-shaped hanger bar 14f. The upper ends of this U-shaped bar are welded to the socket channel side flanges as shown. The return stretch of the endless belt 10 runs on the rollers 14e between the sides of the hanger bar 14f and is thereby guided with minimum friction. No other support is required for the lower stretch of the belt than that afforded by these guide rollers mounted in the intermediate socket units 14.

The end stands 16 and 18 may be substantially identical so that by describing the stand 16 it will be understood that similar remarks apply to the opposite stand 18.

The stand 16 comprises a frame having upright side members 16a, rearwardly (i. e. away from the body of the conveyor) extending platform guide members 16b, a transverse brace 16c interconnecting the members 16a, pairs of longitudinally extending guides 16d on opposite sides of the frame, and a transverse brace 16e extending across the top of the frame. The pairs of vertically spaced guide bars 16d project rearwardly from the uprights 16a and serve as supporting guides for the longitudinally adjustable sliding journals 16f in which the shaft 16g of the belt drive pulley 16h rotates. The longitudinally adjusted positions of the respective sliding journals 16f may be varied by means of the jack screws 16i and cooperating nuts 16j which bear against end plates 16k interconnecting the projecting ends of the respective pairs of guides 16d. These jack screws are preferably about a foot and a half to two feet long, as are the pairs of guides 16d, so as to provide a relatively large amount of belt take-up adjustment for relatively long conveyor stretches.

Additional belt take-up may be effected quickly by means of rocker arms in the form of double bell cranks comprising the pairs of operating lever arms 16m and roller support arms 16p interconnected by the roller shaft carrying rollers 16n. This rocker arm belt-tensioning unit is pivotally mounted on the pulley drive shaft 16g and has a segmental ratchet 16q carried on each end engageable by a pawl 16r. The pawls are pivoted on pin 16s carried by the adjacent pillow blocks or journals 16f. Thus the belt may be quickly tensioned by clockwise rotation of the bell crank unit (Figure 5) into any adjusted position of the pulley shaft 16g effected by the jack screws 16i. By such movement the belt tensioning rollers 16n are caused to bear upwardly against the lower stretch of the belt in order to deflect the belt hence take up excess slack therein while increasing the belt's angle of wrap around the pulley 16h for drive purposes. In order to prevent the belt from scraping against the bottom of the cross brace 16e a pair of guide rollers 16t are mounted between depending guide arms 16u spaced apart to accommodate the belt between them. The rollers 16t contact the upper face of the bottom stretch of the belt.

Upon the cross brace 16e is mounted a longitudinally extending socket channel 16v similar to the socket channels 14a of the supporting units previously described. The outer end of the endmost spanning channel 12 enters the socket 16v to a limiting position established by the channel's bar stop 12a as before. In the opposite end of the socket 16v a short channel extension 16w is inserted which may be slid in and out varying distances depending upon the longitudinally adjusted position of the sliding journals 16f. The extension channel 16w provides retaining sides for the variable length portion of upper belt stretch which extends the distance between the pulley 16h and the end of the socket 16v, so that berries carried by the belt will not be permitted to drop off the side of the belt while traveling the remaining distance to the end of the conveyor where they drop into a container C placed beneath the pulley.

For reasons of convenience the end stand is provided with a slidable platform 16x of sheet metal having suitably reinforced edges by which it is guided for longitudinal sliding adjustment on the two runners 16b. A transverse retaining bar 16y is mounted near the forward end of the platform on its bottom side and has opposite ends which are bent to lodge slidably beneath the horizontal flanges of the runners 16b. This platform may be shifted longitudinally so as to provide a stable support for a packing container C positioned directly beneath the discharge end of the conveyor in any longitudinally adjusted position of the pulley lengthwise of the stand 16. The retaining bar 16y permits substantial overhang of the platform carrying a container of berries beyond the end of the guide runners 166 without tilting downward appreciably.

For driving purposes the end of the pulley shaft 16g is formed with a square cross section or is otherwise adapted to provide a detachable connection with a complemental drive element 20a of the power unit 20. The portable power unit 20 preferably is mounted on a wheelbarrow chassis or other convenient wheeled support of a like nature such that when the drive coupling 20a is detached from the pulley shaft the power unit may be wheeled to a new position to be established for the conveyor. This power unit comprises the gasoline driven motor 20b, gear reduction box 20c and a stationary shaft 20d connected through a universal coupling 20e to a variable-length shaft section 20f having two relatively telescoping sections which are splined together for conjoint rotation. The outer end of the telescoping shaft 20f is provided with a second universal coupling 20g which in turn is connected to the releasable drive coupling element 20a engageable with the end of the pulley shaft on either end stand 16 or 18. Because of the telescoping form of the shaft 20f and the provision of universal couplings on the ends thereof, the power unit may be connected to the pulley shaft 16g without exercising critical judgment or care in positioning the power unit. This is important in the field because of the uneven nature of the ground and the desire to set up the conveyor in a new position without loss of time. Moreover, such a power transmission arrangement permits belt take-up adjustment of the pulley shaft without disconnecting or moving the portable power unit 20.

A prop 20h carrying a cradle or rest 20i is provided on the forward end of the power unit chassis in order to support the telescoping shaft 20f when the power unit is being wheeled from one position to another. The shaft is conveniently lodged in the rest 20i by maneuvering the wheelbarrow chassis so that the cradle 20i is positioned directly below the shaft 20f when the wheelbarrow is being backed up to pull the socket 20a from its driving connection with the end of the pulley shaft 16g. The shaft 20f drops directly into this cradle upon its release from the pulley shaft.

It will be noted that the length and breadth of the stands 16 and 18 are not dictated by any requirement that the stands serve as a stable support for the end portion or section of the conveyor structure in general since once the conveyor belt is laced together and placed under the desired tension by means of the jack screws 16i and the rocker arm rollers 16n, the conveyor constitutes an integrated structure held together entirely by belt tension. In that regard the intermediate supports 14 and the end stands 16 and 18 serve merely as props or shoring devices maintaining the compressioned-loaded structure at a desired elevation and attitude above ground.

By making the spanning channels 12 of relatively flexible material such as sheet metal the long conveyor structure possesses an unusual degree of flexibility permitting it to assume curvature both in vertical and horizontal planes and in varying degrees without impairing the structure nor the conveyor operation. A bend in the conveyor usually involves a twisting of the one or more spanning channels involved. This fact together with the inherent flexibility of the belt permits such belt to slide freely in the aligned channels and follow moderate curves in the elongated structure without rubbing or chafing unduly. The free fit of the ends of the spanning channels in the socket channels and the formation of the latter out of sheet metal also adds somewhat to the flexibility of the entire structure.

It is preferred that the opposite end stands 16 and 18 be made alike so that each has provisions whereby its pulley may be the driven pulley, depending upon the desired direction of conveyance of the picked strawberries, and also so that the total amount of belt take-up which may be achieved in the conveyor may be double that attainable by the take-up means of a single end stand.

When the conveyor apparatus has been set up as in Figure 1, preferably directly above and along a row of strawberries, the pickers will be stationed at selected points X along the row and each will cover a different section of the row. An inspector may station himself at the side of the conveyor near the discharge end thereof so as to examine the berries moving on the carrier belt and remove any spoiled ones and debris before they reach the container C. Preferably the pickers carry no hallocks or other containers but pick directly into the conveyor trough positioned immediately above the berry plants. Thus they are relatively free to move about and to use both hands in picking without hindrance from a picking container carried about in the former awkward manner.

After the pickers have covered their individual assigned portions of the row of plants, they will assume stations along the conveyor and at a given signal will grasp one of the handles 14d for instance in order to pick up the conveyor bodily and shift it to an adjacent row of plants. Two of the pickers will lift the end stands and shift them at the same time. Another person, such as the inspector, will move the power unit 20 in the manner of handling an ordinary wheelbarrow in order to follow the end stand to the newly established position of the conveyor apparatus. After acting as a team in shifting the conveyor intact from one row to the next, the pickers may resume their work on the new row of berry plants. In this manner an entire field may be covered in relatively short order.

After a field has been picked over, the conveyor apparatus may be disassembled by first unlacing the belt and rolling it up in compact form to be placed in a truck or other means of conveyance. The portable power unit 20, of course, is detached from the driven pulley shaft and the corresponding end stand 16 or 18 is then disengaged from the end of the adjoining spanning channel 12 by direct longitudinal retraction therefrom. Following this that channel is disengaged by direct longitudinal retraction from the socket of the first support unit 14 and the latter is then similarly disengaged from the succeeding spanning channel 12. In like manner the conveyor structure is easily and quickly disassembled progressively along its entire length. Conveniently the spanning channels of the dismantled conveyor may then be bundled together compactly, as may the intermediate supporting units 14 in order for them to be easily handled and loaded into the truck for transportation purposes. This high degree of portability and ease of dismantling and reassembling the conveyor components is very important in its application to the harvesting of strawberries and like crops because a crew of pickers using the novel conveyor apparatus will be able to cover a large field of berries in a relatively short time and to avoid wasting time will have to move immediately to another field for resuming their work.

I claim as my invention:

1. Multiple section portable conveyor apparatus comprising a plurality of elongated, open spanning channels, a plurality of intermediate support means adapted for interconnecting and supporting said channels in series alignment to form a conveyor belt open guide trough, said intermediate support means including an aligning channel socket member adapted for the direct longitudinal insertion and removal of the adjoining ends of successively adjacent channels in opposite ends of said socket member, said socket member having means supporting the same in predetermined elevated position, an endless conveyor belt having an upper stretch slidably supported on the bottom of said guide trough throughout the length thereof, two oppositely disposed end supports respectively comprising a channel socket member disposed for receiving by direct longitudinal insertion the outer end of the adjacent endmost spanning channel, a belt guide pulley having a shaft journaled on the end support for disposing such pulley in position to guide said endless conveyor belt for sliding longitudinally in said guide trough, belt tensioning means on at least one of said end supports adapted for taking up slack in said conveyor belt and thereby for placing said series of spanning channels and socket members under compression effective to hold said channels and socket members together in series alignment, said socket members and the respective channel ends engaged therewith having cooperating means limiting said longitudinal insertion of said channel ends in said socket members when placed under compression by said belt tensioning means, and portable power means detachably connected to the shaft of one of said pulleys for operatively moving said conveyor belt in said guide trough.

2. The multiple section portable conveyor apparatus defined in claim 1, wherein the spanning channels are formed of relatively lightweight flexible sheet metal permitting restricted distortion of the guide trough without impairment of conveyor operation.

3. The multiple section portable conveyor apparatus defined in claim 2, wherein the channel bottoms are formed with antifriction humps projecting upwardly therefrom for sliding contact with the conveyor belt.

4. The multiple section portable conveyor apparatus defined in claim 3, wherein the channel bottoms are provided with drain openings.

5. The multiple section portable conveyor apparatus defined in claim 4, wherein the antifriction humps comprise elongated ribs extending transversely of the channels and the drain openings comprise slits formed along the bases of the respective ribs.

6. The multiple section portable conveyor apparatus defined in claim 1, wherein the intermediate socket members are of channel form having inwardly reversely folded flanges adapted for receiving and retaining the spanning channel flanges therein.

7. The multiple section portable conveyor apparatus defined in claim 6, wherein the spanning channels and intermediate socket members are formed of sheet metal.

8. The multiple section portable conveyor apparatus defined in claim 7, wherein the spanning channel bottoms are provided with antifriction ribs struck up therefrom and having drain slits formed along the bases of the respective ribs.

9. The conveyor apparatus defined in claim 1, wherein the belt tensioning means comprises pulley shaft journal means longitudinally adjustable in the end support for principal belt take-up positioning of the corresponding pulley, and adjustable rocker arm means carried by said journal means for pivoting on a transverse axis parallel to the pulley rotation axis, said rocker arm means carrying a belt guide roller engageable with the lower stretch of conveyor belt for deflecting such belt variably and thereby providing secondary belt take-up adjustment.

10. The conveyor apparatus defined in claim 9, wherein the socket member of the end support is open at both ends and carries an extension channel longitudinally adjustable therein to project from the end of said latter socket member substantially to the guide pulley in the various longitudinally adjusted positions of such pulley.

11. The conveyor apparatus defined in claim 9, wherein the portable power means comprises motive power means mounted on a wheelbarrow-type chassis, a driven shaft connected at one end to be driven by said motive power means and projecting generally forwardly from said chassis, said drive shaft having first and second universal couplings therein interconnected by a variable-length section of drive shaft comprising mutually aligned rotatively interconnected elements relatively movable longitudinally of each other, and coupling means on the end of said drive shaft adapted for detachable connection to the pulley shaft.

12. The conveyor apparatus defined in claim 9, wherein the portable power means comprises motive power means mounted on a wheelbarrow-type chassis, a drive shaft connected at one end to be driven by said motive power means and projecting generally forwardly from said chassis, said drive shaft being flexible, and coupling means on the end of said drive shaft adapted for detachable connection to the pulley shaft.

13. In a multiple section conveyor for field crop harvesting, an endless conveyor belt, opposite end support means disposed at opposite ends of said conveyor and having pulleys for guiding said belt and means for establishing predetermined tension therein, and structural means forming a trough guiding the upper stretch of said belt and structurally resisting such belt tension, said structural means comprising a plurality of elongated sheet metal channels extending in series alignment between said end supports, and a plurality of intermediate supports interconnecting and supporting the adjoining ends of successively adjacent channels, said intermediate supports comprising channel-like sockets slidably receiving said channel ends and including retaining means carried by the flanges of said channel-like sockets slidably engaging the flanges of the respective channels for holding such channels in substantial alignment in said sockets, and stop means limiting relative penetration of said channel ends in said supports, respectively.

14. The conveyor defined in claim 13, wherein the intermediate supports additionally comprise transversely spaced adjustable-length legs, and guide means mounted between said legs beneath the socket for guiding the lower stretch of conveyor belt thereon.

15. The conveyor defined in claim 13, wherein the intermediate supports additionally comprise transversely spaced adjustable-length telescoping legs, and guide means mounted between said legs beneath the socket for guiding the lower stretch of conveyor belt thereon, said socket being formed of sheet metal in channel form, and the retaining means thereof comprising inwardly and reversely folded channel flanges, the stop means comprising stops mounted on the channels near the respective ends of such channels limiting penetration thereof in said socket.

16. Multiple section portable conveyor apparatus comprising a plurality of elongated, open spanning channels formed of relatively lightweight flexible sheet metal, a plurality of intermediate support means adapted for interconnecting and supporting said channels in series alignment to form a conveyor belt open guide trough, said intermediate support means including an aligning channel socket member adapted for holding the adjoining ends of successively adjacent channels in substantial alignment received in opposite ends of said socket member, means operable upon such interengagement of said socket members and the respective channel ends for restraining the adjoining ends of successively adjacent channels against further relative approach movement toward each other in said socket members engaged therewith, said socket member having means supporting the same in predetermined elevated position, an endless conveyor belt having an upper stretch slidably supported on the bottom of said guide trough throughout the length thereof, two oppositely disposed end supports respectively comprising a channel socket member disposed for receiving and supporting the outer end of the adjacent endmost spanning channel, a belt guide pulley having a shaft journaled on the end support for disposing such pulley in position to guide said endless conveyor belt for sliding longitudinally in said guide trough, belt tensioning means mounted on the conveyor apparatus adapted for taking up slack in said conveyor belt and thereby for placing said series of spanning channels and socket members under compression effective to hold said channels and socket member together in series alignment, and power means connected to the shaft of one of said pulleys for operatively moving said conveyor belt in said guide trough.

17. The multiple section portable conveyor apparatus defined in claim 16, wherein the channel bottoms are formed with antifriction humps projecting upwardly therefrom for sliding contact with the conveyor belt.

18. The multiple section portable conveyor apparatus defined in claim 17, wherein the channel bottoms are provided with drain openings.

19. The multiple section portable conveyor apparatus defined in claim 16, wherein the intermediate socket members are of channel form having inwardly reversely folded flanges adapted for receiving and retaining the spanning channel flanges therein.

20. The multiple section portable conveyor apparatus defined in claim 19, wherein the spanning channel bottoms are provided with antifriction ribs struck up therefrom and having drain slits formed along the bases of the respective ribs.

21. The conveyor apparatus defined in claim 16, wherein the belt tensioning means comprises pulley shaft journal means longitudinally adjustable in the end support for principal belt take-up positioning of the corresponding pulley, and adjustable rocker arm means carried by said journal means for pivoting on a transverse axis parallel to the pulley rotation axis, said rocker arm means carrying a belt guide roller engageable with the lower stretch of conveyor belt for deflecting such belt variably and thereby providing secondary belt take-up adjustment.

22. The conveyor apparatus defined in claim 21, wherein the socket member of the end support is open at both ends and carries an extension channel longitudinally adjustable therein to project from the end of said latter socket member substantially to the guide pulley in the various longitudinally adjusted positions of such pulley.

References Cited in the file of this patent

UNITED STATES PATENTS

| | | |
|---|---|---|
| Re. 23,618 | Joy | Feb. 10, 1953 |
| 1,006,790 | Reinbold | Oct. 24, 1911 |
| 1,504,846 | Tarkington | Aug. 12, 1924 |
| 2,105,889 | Madeira | Jan. 18, 1938 |